United States Patent
Palmer et al.

(10) Patent No.: US 10,002,165 B2
(45) Date of Patent: *Jun. 19, 2018

(54) HOLISTIC FEDERATED RANKING ALGORITHM

(71) Applicant: International Business Machines Corporation, Armonk, NY (US)

(72) Inventors: Christopher R. Palmer, Pittsburgh, PA (US); Jerome M. Pesenti, Pittsburgh, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/536,327

(22) Filed: Nov. 7, 2014

(65) Prior Publication Data

US 2016/0132503 A1    May 12, 2016

(51) Int. Cl.
*G06F 17/30* (2006.01)
*G06F 7/00* (2006.01)

(52) U.S. Cl.
CPC .... *G06F 17/3053* (2013.01); *G06F 17/30864* (2013.01)

(58) Field of Classification Search
CPC ......... G06F 17/30864; G06F 17/30867; G06F 17/30637; G06Q 30/02; G06Q 30/0241
USPC ....................................................... 707/706
See application file for complete search history.

(56) References Cited

U.S. PATENT DOCUMENTS

| | | | |
|---|---|---|---|
| 7,783,630 B1 | 8/2010 | Chevalier et al. | |
| 2003/0195877 A1* | 10/2003 | Ford | G06F 17/30705 |
| 2007/0150515 A1* | 6/2007 | Brave | G06F 17/30867 |
| 2007/0192300 A1* | 8/2007 | Reuther | G06F 17/30427 |
| 2008/0077570 A1* | 3/2008 | Tang | G06F 17/30684 |
| 2010/0023502 A1 | 1/2010 | Marlow | |

OTHER PUBLICATIONS

List of IBM Patents or Patent Applications Treated as Related.
Palmer et al.: "Holistic Federated Ranking Algorithm"; U.S. Appl. No. 14/693,529, filed Apr. 22, 2015.
Yangxi, L. et al.; "Difficulty Guided Image Retrieval Using Linear Multiple Feature Embedding"; IEEE Transactions on Multimedia, vol. 14, No. 6, pp. 1618-1630, Dec. 2012.

(Continued)

*Primary Examiner* — Usmaan Saeed
*Assistant Examiner* — Raquel Perez-Arroyo
(74) *Attorney, Agent, or Firm* — Patterson + Sheridan, LLP (57) ABSTRACT

Techniques are disclosed for generating a unified ranking of search results received from a plurality of distinct search resources. A computing system executing a federated search application receives a set of ranked search results from multiple search resources (e.g., web-based search engines, public databases and catalogs, etc.). Each search result identifies an item and includes metadata characterizing the item. The federated search application determines a unified ranking for the items identified in the search results that preserves a relative ranking of each set of items, such that a result for a given item is ranked above other results for items in the associated set of items is ranked above the other results in the unified ranking.

9 Claims, 6 Drawing Sheets

(56) References Cited

OTHER PUBLICATIONS

Dzung, H. et al.; "Mixture Model with Multiple Centralized Retrieval Algorithms for Result Merging in Federated Search"; Proceedings of the 35th Annual International ACM SIGIR Conference on Research & Development in Information Retrieval (SIGIR 2012), pp. 821-830, ACM; 2012.

IBM; "Federated Access Control in Distributed Data Warehousing Application", An IP.com Prior Art Database Technical Disclosure; http://ip.com/IPCOM/000176162D; Nov. 6, 2008.

Zhu, W-D. et al.; "Federated Content Management—Accessing Content from Disparate Repositories with IBM Content Federation Services and IBM Content Integrator"; IBM Corporation, http://www.ibm.com/redbooks/sg24-7742-00 . . . ; Apr. 2010.

\* cited by examiner

HOLISTIC FEDERATED RANKING ALGORITHM

BACKGROUND

The present disclosure relates to federated search, and more specifically, to generating a unified ranking of search results from disparate search resources.

Federated search allows a user to search for information through multiple resources simultaneously. To do so, a user may submit a search query request to a federated search engine. In turn, the federated search engine queries multiple resources, such as web-based search engines, library catalogs, government-operated data collections, and the like. The search engines each return a listing of results responsive to the search query request. The results can identify documents relevant to the search query (e.g., (e.g., web sites, news articles, encyclopedia entries, bibliographies, etc.). Further, the results in each listing may be ranked based on a variety of relevance criteria, such as popularity, timeliness, and the like. The federated search engine aggregates the results received from the resources and presents the results to the user.

Merging ranked results from disparate search resources to create an aggregate listing of re-ranked results is an issue in federated search. For instance, each search resource may use heuristics that are distinct from other resources to rank results. As a result, the federated search engine needs to determine which results should be ranked higher than the others. For example, given non-overlapping search result listings from two resources A and B, the federated search engine must determine whether the first result from resource A should be ranked higher than the first result from resource B, or even the second or third result from resource B.

The federated search engine may use a variety of approaches to reconcile results received from search resources. For example, if there is large overlap in the search results the federated search engine can combine relevancy scores for results returned by the resources. Doing so allows the federated search engine to rerank results from different resources based on the combined scores. However, if the search results scarcely overlap, the combined scores may lead to purely interleaved results, where some results may be given an unduly amount of importance over others. As another example, the federated search engine can re-rank the results based on a consistent relevancy calculation with regard to the search query. However, this approach requires that the federated search engine download each search result to access the full text to calculate the relevancy. Further, the approach may be error prone, where the most relevant results appear towards the bottom of the rankings Another approach is to create a profile for each federated resource. That is, the federated search engine determines which resources are more authoritative for a given query and only submits the query to those resources. As a result, these approaches may lead to a longer response time for presenting the results to the user.

SUMMARY

One embodiment presented herein describes a method for ranking search results received from a plurality of distinct search resources. The method generally includes receiving from each of a plurality of search resources, a set of ranked search results. Each search result identifies an item. Each search result includes metadata characterizing the item. The method also generally includes determining, by a computer processor, a unified ranking for the search results. The unified ranking maintains a relative ranking of each set of results as received from the plurality of search resources. A ranking of a first result in the unified ranking is determined based on metadata of the first result and metadata of each second result having a lower rank than the first result in the associated set of results. The search results are ordered by the determined unified ranking.

Another embodiment presented herein describes a system having a processor and a memory storing a program, which, when executed, performs an operation for ranking search results received from a plurality of distinct search resources. The operation itself generally includes receiving from each of a plurality of search resources, a set of ranked search results. Each search result identifies an item. Each search result includes metadata characterizing the item. The operation also generally includes determining, by a computer processor, a unified ranking for the search results. The unified ranking maintains a relative ranking of each set of results as received from the plurality of search resources. A ranking of a first result in the unified ranking is determined based on metadata of the first result and metadata of each second result having a lower rank than the first result in the associated set of results. The search results are ordered by the determined unified ranking.

Another embodiment presented herein describes a computer program product having a computer-readable storage medium having computer-readable program code configured to perform an operation for ranking search results received from a plurality of distinct search resources. The operation itself generally includes receiving from each of a plurality of search resources, a set of ranked search results. Each search result identifies an item. Each search result includes metadata characterizing the item. The operation also generally includes determining, by a computer processor, a unified ranking for the search results. The unified ranking maintains a relative ranking of each set of results as received from the plurality of search resources. A ranking of a first result in the unified ranking is determined based on metadata of the first result and metadata of each second result having a lower rank than the first result in the associated set of results. The search results are ordered by the determined unified ranking.

DETAILED DESCRIPTION

Embodiments presented herein disclose techniques ranking search results in response to a federated search query. In one embodiment, a computing system executing a federated search application receives a search query. The federated search application transmits the search query to multiple search resources (e.g., web-based search engines, publicly accessibly library catalogs, government databases, private databases, etc.). In turn, each search resources return a listing of search results. The search results from each search resource may include a list of titles and references to a full version of the document (e.g., a URL for accessing the document). Further, the search results received from each resource may be ranked based on various heuristics established by the resource. For example, a search resource may rank results based on timeliness of the items, relevance of the documents to the search result, and frequency of access to the documents.

In one embodiment, the federated search application generates a unified ranking aggregating the search result listings received from the search resources. To do so, the federated search application preserves a relative ranking in each of the listings. In doing so, the federated search application assumes that the sources do not communicate with one another. That is, each search resource is presumed to operate independently to provide a set of search results. Further, the federated search application also relies on a limited set of metadata characterizing each search result, e.g., a title and summary returned by the search resource.

To preserve a relative ranking of each listing, the federated search application scores results of the listings. In one embodiment, the federated search application scores higher-ranked results from a given listing over lower-ranked results from the same listing. Consequently, a result N from a ranked search result listing is scored higher than every N+k result from that same listing. The federated search application leverages this relative scoring when evaluating between result listings from other resources, also scored similarly.

For example, assume a federated search application submits a search query to two search resources A and B. In turn, search resources A and B each return a search result listing that includes ten items ranked based on various relevance criteria. The federated search application evaluates the top results of each listing to determine which result to rank first, i.e., the results ranked as first in the listings of A and B. That is, the federated search application generates a unified ranking where the first result from A will be ranked higher than the remaining nine results of A. Likewise, the federated search application also implicitly recognizes that the unified ranking will list the first result from B higher than the remaining nine results of B.

The federated search application may evaluate the metadata of each result to determine the ranking, such as relevancy scores, dates, query matching, etc. Specifically, the federated search application evaluates each result (e.g., a result N) based on the metadata of that result and the metadata of successive results (e.g., results N, N+1, N+2, . . . , N+K). In this case, assume that the federated search application determines that the first result of A is ranked higher than the first result of B. Once determined, the federated search application may evaluate the first result of B with the second result of A, the third result of A, and so on. Once the federated search application generates the unified ranking, the application may present the results to the user listed based on the ranking.

Because each originating search resource generally has access to more information than the federated search engine, at least relative to the documents it ranks in the search results, the federated search engine preserves the local ranking of each search resource. That is, the search resources may have access to full documents as well as other metadata used in generating rankings, such as incoming links, usage logs, and freshness measures. Therefore, rather than evaluate the full documents, the federated search application relies on the relative rankings from the search resources. Advantageously, the federated search application consumes fewer computing resources when evaluating each individual result. Further, the approach is less error-prone than a simple re-ranking of results.

Figure 1:
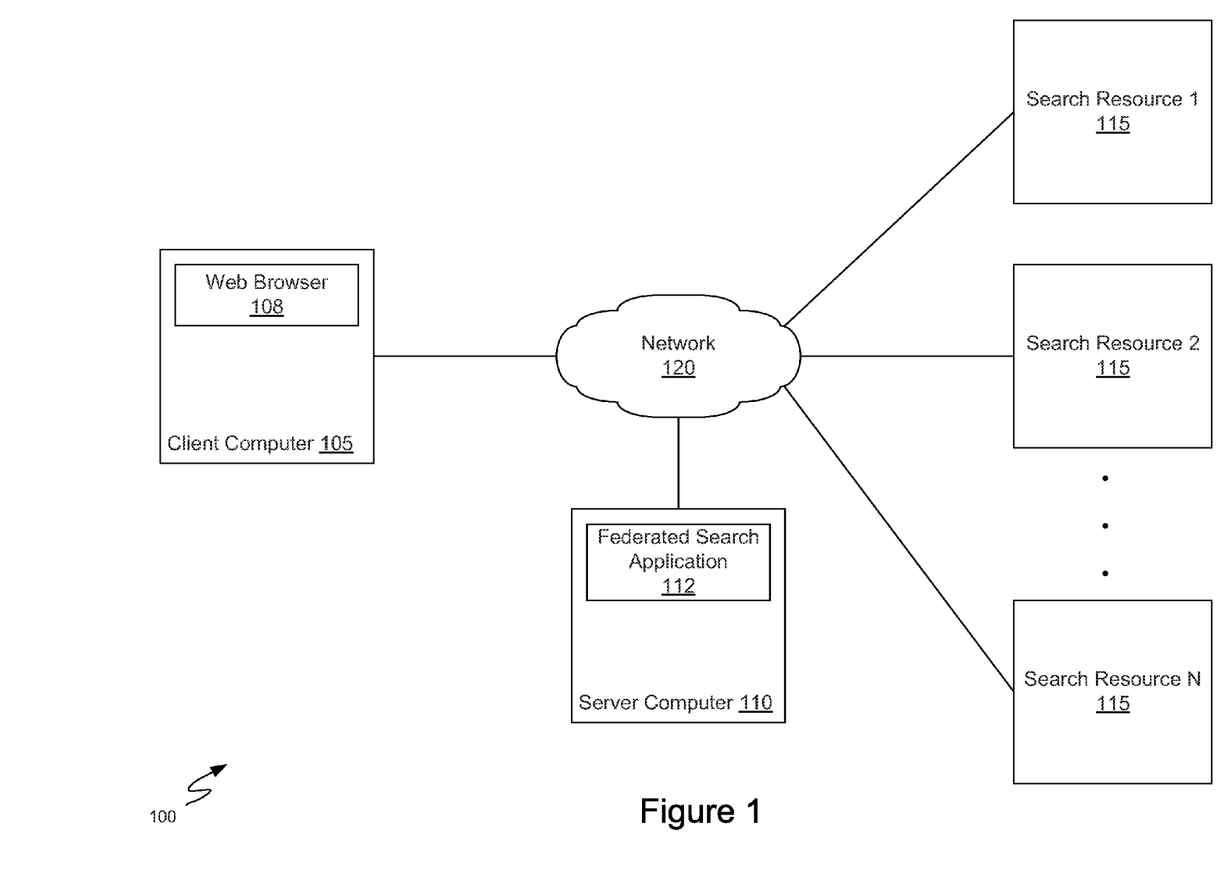
FIG. 1 illustrates an example computing environment, according to one embodiment.

FIG. 1 illustrates an example computing environment 100, according to one embodiment. The computing environment 100 includes a client computer 105, a server computer 110, and multiple federated search sources 115. The client computer 105 and server computer 110 may be a physical computing system or a virtual machine instance in a computing cloud.

The server computer 110 includes a federated search application 112. The federated search application 112 generally receives a search query request from the client computer 105 (e.g., via a web browser 108 connected to a network 120). In turn, the federated search application 112 transmits the search query requests to one or more federated search resources 115 over network 120.

The federated search resources 115 may be public access bibliographic databases, public access library catalogs, web-based search engines, government-operated or corporate data collections, etc. The server computer 115 may access some search resources 115 over the Internet, while accessing others over a local network (e.g., a corporate intranet). The search resources 115 retrieve results responding to the search query. In addition, the search resources 115 may rank the results based on various relevancy criteria, such as timeliness, popularity, and so on. The search resources 115 send a listing of the ranked results to the federated search application 112.

In one embodiment, the federated search application 112 merges the ranked search result listings sent by the search resources 115. Further, the federated search application 112 generates a unified ranking of the results from the various search resources 115. To do so, the federated search application 112 determines a ranking that preserves the relative rankings present in the results of each search resource 115. That is, the higher-ranked results from a given listing will always have a higher rank in the unified ranking that lower-ranked results from the same listing.

Figure 2:
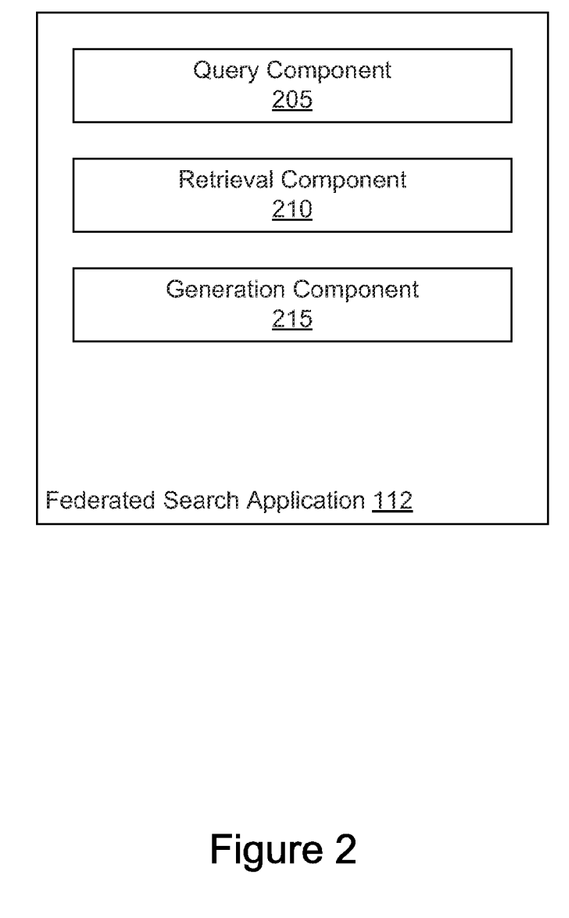
FIG. 2 further illustrates the federated search application described relative to FIG. 1, according to one embodiment.

FIG. 2 further illustrates the federated search application 112, according to one embodiment. As stated, the federated search application 112 relays a search query request from a client computer 105 to a number of federated search resources. The federated search application 112 receives a listing of ranked results from each search resource. Once received, the federated search application 112 aggregates the listings and presents the aggregated listing to the user. As shown, the federated search application 112 includes a query component 205, a retrieval component 210, and a generation component 215.

In one embodiment, the query component 205 sends a search query request received from a user to federated search resources 115. As stated, the federated search resources 115 may include web-based search engines, government databases, public access library catalogs, intranet search engines, and so on. Prior to sending the search query to the resources 115, the query component 205 may convert the query to formats as appropriate for each search resource 115. Further, the query component 205 may specify additional parameters to the search resources 115 based on a configuration of the federated search application 112, such as a predefined amount of results for the resources 115 to return.

The retrieval component 210 receives listings of search results from the federated search resources 115. Each result may identify an item (e.g., a web site, document, news article, etc.), a reference to the item, and metadata. Generally, the metadata represents data associated with each result returned by the search resources 115, e.g., a dynamic snippet provided by a given search resource 115 characterizing the result.

In one embodiment, the generation component 215 determines a unified ranking for an aggregate of the results in the multiple listings. To do so, the generation component 215 may perform a scoring algorithm that preserves relative rankings generated by each federated search resource 115. The algorithm evaluates results provided by each of the search resources. The algorithm may evaluate a given result (e.g., a result N) of a listing using the metadata of that result and metadata of successive results in the listing (e.g., metadata of results N, N+1, . . . , N+K). Such an algorithm may be expressed in a variety of manners.

One example of the scoring algorithm organizes the results based on rankings or scorings provided by each resource, expressed as:

$$\text{score}_1(src,N) = f(N) \tag{1}$$

where src is a search resource 115, N is the result rank, and f is a growing function. Equation (1) yields a straight interleaving of search results.

Another example of an algorithm that preserves the relative relevancy of resource search results sums matching scores of results ranked below a current result, expressed as:

$$\text{score}_2(src,N) = \Sigma_{i=N}^{nes(src)} \text{match}(src,i,\text{query}) * p^i, p \in [0,1] \tag{2}$$

where nres is the number of results returned for a source and match is the matching score of a given result i for a search query. In another embodiment, the sum in equation (2) may be replaced with a max function:

$$\text{score}_3(src,N) = \max(\{\text{match}(src,i,\text{query}), i \in [N, \text{nres}(src)]\}) \tag{3}$$

Another example combines any number and combination of scoring functions to determine a ranking. For instance, such an algorithm may combine Equations (1)-(3):

$$\text{score}(src,N) = \alpha * \text{score}_1(src,N) + \beta * \text{score}_2(src,N) + \gamma * \text{score}_3(src,N), \alpha,\beta,\gamma \in [0,\infty] \tag{4}$$

where α, β, and γ are weighting co-efficients. The weight α can be adjusted to place more emphasis on maximum marginal relevance between search resources 115.

Once the generation component 215 determines a unified ranking based on the algorithm, the generation component 215 can create a presentation of the results listed based on the unified ranking to the client computer 105.

Figure 3:
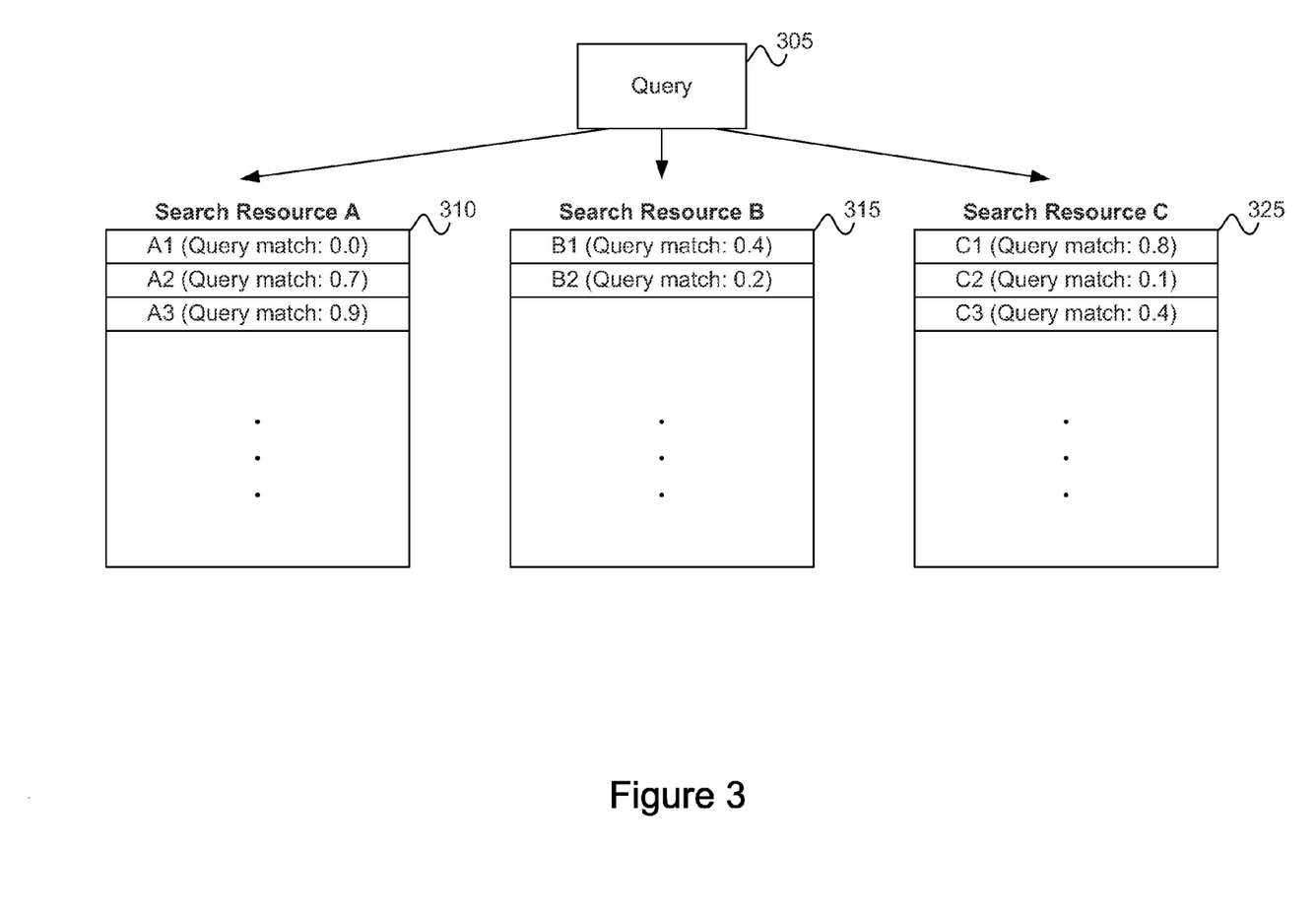
FIG. 3 illustrates an example of search results returned by disparate search resources, according to one embodiment.

FIG. 3 illustrates an example of search results returned by disparate search resources, according to one embodiment. Specifically, the query component 205 sends a query 305 to search resources A, B, and C. Each of the search resources A, B, and C generate results listings 310, 315, and 320. As stated, the query component 205 may specify a predetermined amount of results to the search resources to return.

The results in the listings 310, 315, and 320 each identify a particular item (e.g., document, bibliography, news article, etc.) associated with the query 305. Although not shown, the results are associated with attributes such as a title, summary, dates, and the like. Further, as shown, the results include query matching scores representing how closely the content in each of the result items correspond to the query 305.

Illustratively, the results of each of the listing are ranked based on criteria established by the individual search resources A, B, and C. For example, for search resource A, A1 is ranked higher than A2, A3, and so on. Likewise, for search resource C, C1 is ranked higher than C2, C3, and so on. The federated search application 112 generates a unified ranking of the aggregate of the results listings 310, 315, and 320 based on the relative rankings of the listings.

Figure 4:
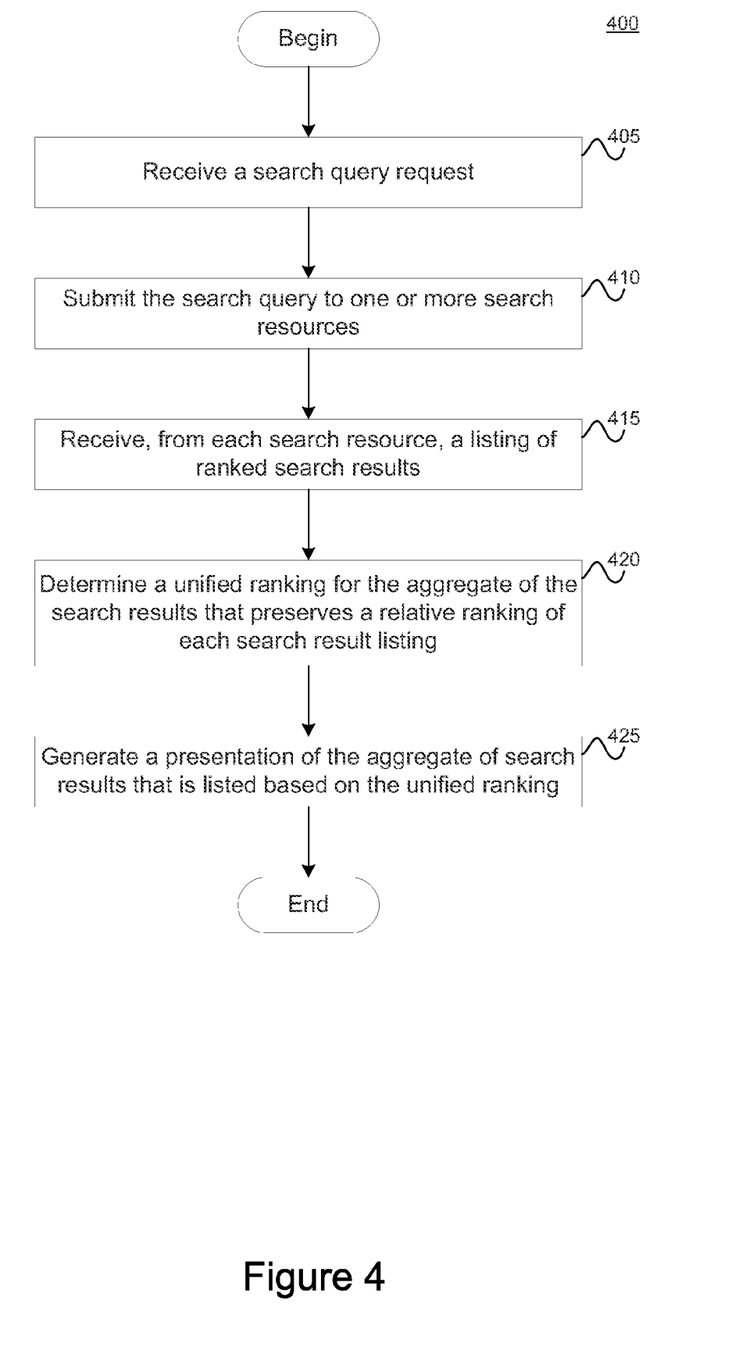
FIG. 4 illustrates a method for generating a unified ranking for search results returned by disparate search resources, according to one embodiment.

FIG. 4 illustrates a method 400 for generating a unified ranking for search results returned by disparate search resources, according to one embodiment. Method 400 begins at step 405, where the query component 205 receives a search query request, e.g., from a client computer 105. The query component 205 may format the search query request to be compatible with various federated search resources 115. At step 410, the query component 205 transmits the search query to the search resources 115. The query component 205 may also specify a predetermined amount of search results for the search resources 115 to return in a listing (e.g., the first ten results).

At step 415, the retrieval component 210 receives, from each search resource 115, a listing of ranked search results to be merged into an aggregate listing. As stated, each of the search results may be ranked based on distinct criteria of a search resource 115. At step 420, the generation component 215 determines a unified ranking for the aggregate listing. In one embodiment, the unified ranking determined by the generation component 215 preserves relative rankings of each search result listing received.

To do so, the generation component 215 scores each resource using an algorithm. The algorithm scores each result relative to the originating search resource 115. Further, the algorithm can also evaluate a listing for a search resource and sum matching scores of results ranked below a current result. In particular, the algorithm may evaluate a given result N using the metadata of N and the metadata of successive results N+1, N+2, . . . , and N+K. Once scores are determined, the generation component 215 ranks the results based on the scores. In the event of a tie score between results of a given resource, the generation component 215 places the result ranking higher in the listing of the resource above the result ranking lower.

At step 425, the generation component 215 creates a presentation of the aggregate listing. The presentation lists the results in the order indicated by the unified ranking. Thereafter, the generation component 215 may present the results to the client computer 105.

Figure 5:
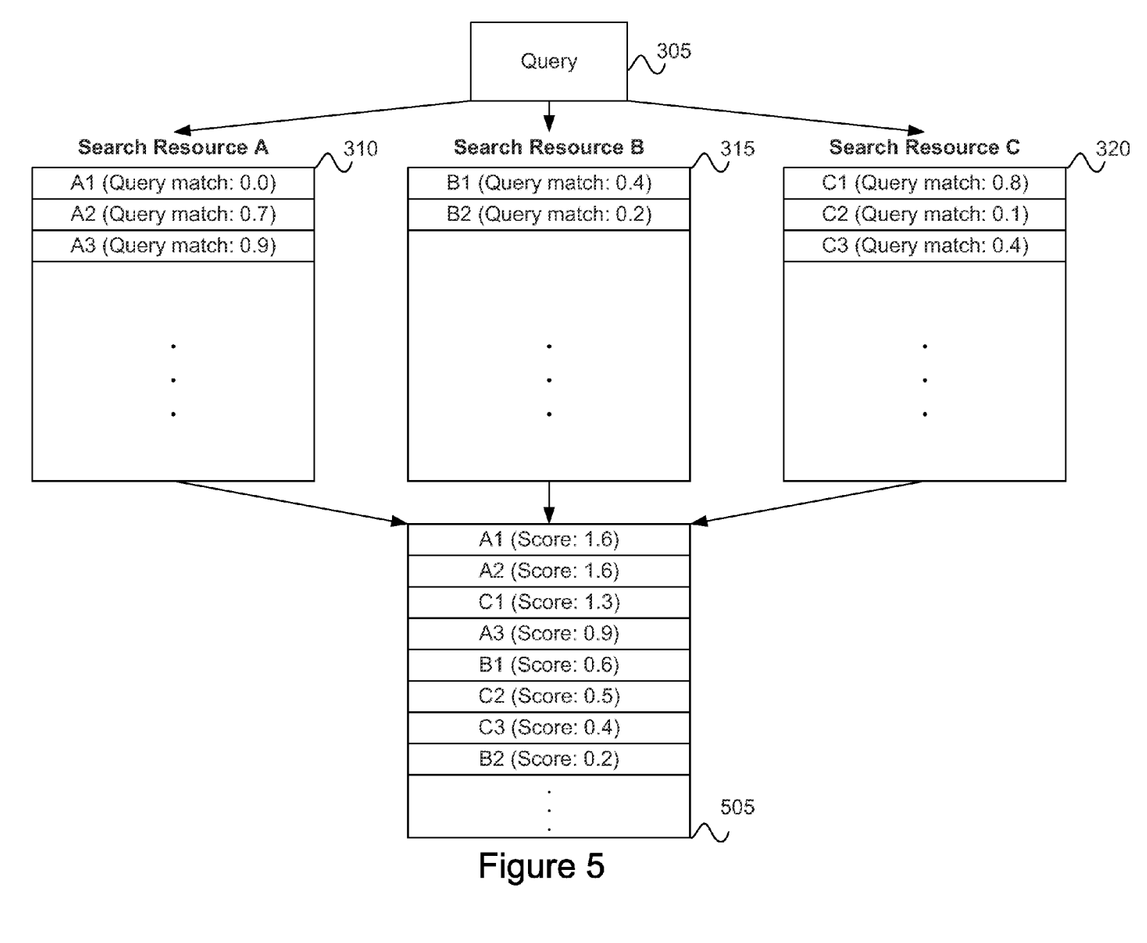
FIG. 5 illustrates an example unified ranking for search results returned by disparate search resources, according to one embodiment.

FIG. 5 illustrates an example unified ranking for search results returned by disparate search resources, according to one embodiment. Specifically, FIG. 5 shows a unified ranking of the results listings of 310, 315, and 320 for the query 305 generated based on the techniques described herein.

Illustratively, an aggregate listing 505 includes the results from search resources A, B, and C. Further, the results are scored based on the scoring algorithm performed by the generation component 215. The scorings allow the generation component 215 to determine rankings for the listing 505. Note that in determining the ranking, the generation component 215 preserves relative rankings of search resources A, B, and C. Consequently, results ranked lower than a given result in a listing of a search resource are also ranked lower than the result in the listing 505. For example, although A1 and A2 share a ranking score of 1.6, the generation component 215 ranks A1 higher than A2 to preserve the relative ranking of search resource A.

Figure 6:
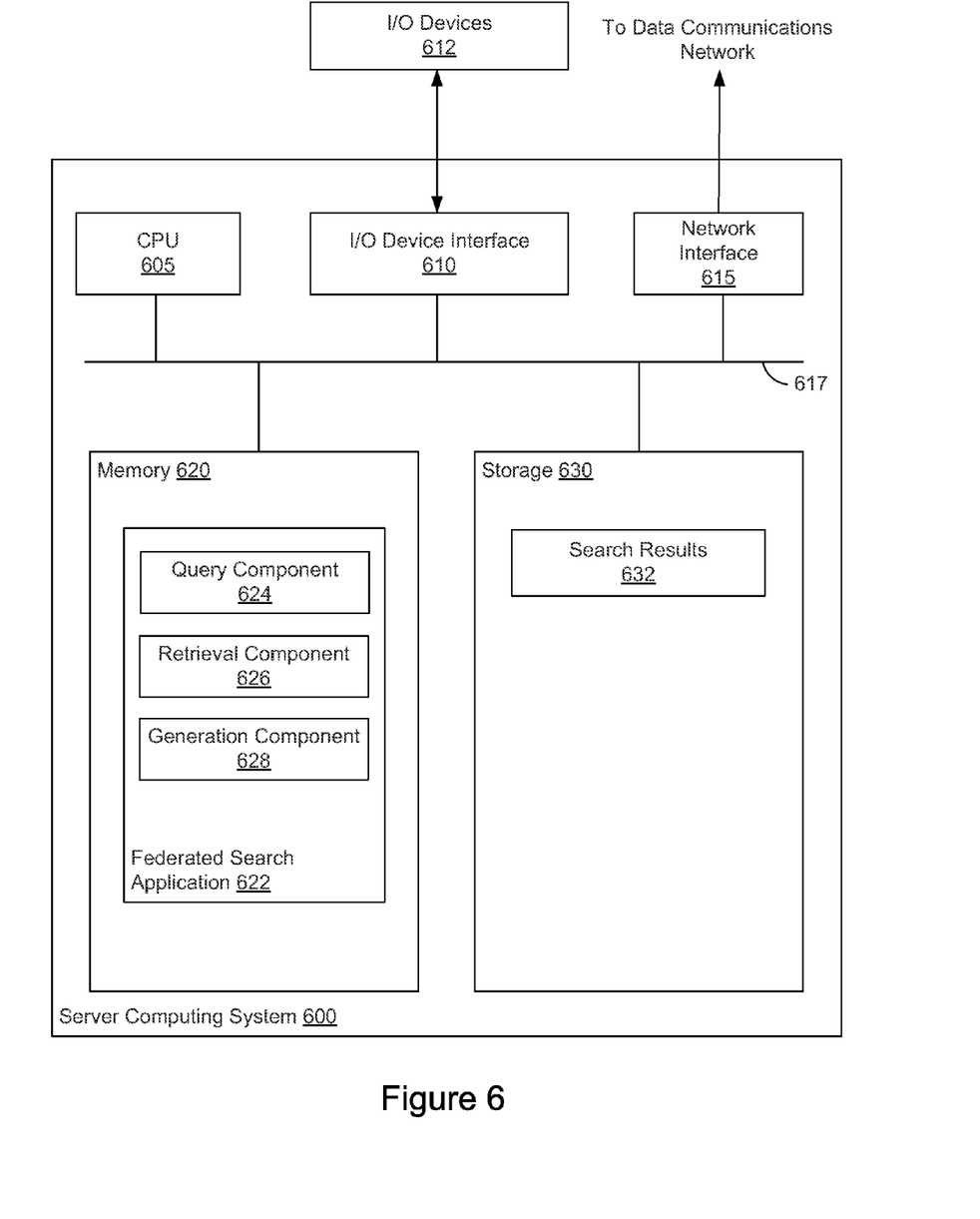
FIG. 6 illustrates an example server computing system configured to generate a unified ranking of search results returned by disparate search resources, according to one embodiment.

FIG. 6 illustrates an example server computing system 600 configured to generate a unified ranking of search results returned by disparate search resources, according to one embodiment. As shown, the server computing system 600 includes, without limitation, a central processing unit (CPU) 605, a network interface 615, a memory 620, and storage 630, each connected to a bus 617. The server computing system 600 may also include an I/O device interface 610 connecting I/O devices 612 (e.g., keyboard, display and mouse devices) to the server computing system 600. Further, in context of this disclosure, the computing elements shown in the server computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a federated search application 622. And storage 630 includes search results 632. The federated search application 622 generates a unified ranking of search results received from multiple search resources. The federated search application 622 further includes a query component 624, a retrieval component 626, and a generation component 628. The query component 624 sends a search query request from a user to one or more search resources. Further, the query component 205 may convert the query to recognizable formats for each of the search resources prior to sending the search query to the respective resources. The retrieval component 626 receives listings of search results 632 from the search resources. The generation component 628 determines a unified ranking for an aggregate of the results in the multiple listings. To do so, the generation component 215 may perform a scoring algorithm that preserves relative rankings generated by each search resource. Once the generation component 628 determines a unified ranking based on the algorithm, the generation component 215 can create a presentation of the results listed based on the unified ranking to the client computer 105.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer programs products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the federated search application 112) or related data available in the cloud. For example, the federated search application 112 could execute on a computing system in the cloud and generate a unified ranking of search results received from multiple disparate search resources. In such a case, the federated search application 112 could perform a scoring algorithm that preserves relative rankings of the listings received from the search resources and store the unified ranked results and other metrics associated with the rankings (e.g., result metadata) at a storage location in the cloud. Doing so allows a user to access this information from any computing system attached to a network connected to the cloud (e.g., the Internet).

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A system, comprising:
    a processor; and
    a memory storing a program, which, when executed on the processor, performs an operation for ranking search results received from a plurality of distinct search resources, the operation comprising:
        receiving a search query over a communications network from a software application executing on a client device;
        transmitting the search query to a plurality of search resources via the communications network;
        receiving, from each of the plurality of search resources, a set of ranked search results, wherein each search result identifies an item and wherein each search result includes metadata characterizing the item and a link to a full version of the item;
        determining a unified match score for each search result in the received sets of ranked search results by summing matching scores of each search result ranked below the respective search result in the respective received set of ranked search results, wherein a unified match score of a first ranked search result is determined based on metadata of the first ranked search result and metadata of each second ranked search result having a lower rank than the first ranked search result in the associated set of ranked search results and wherein the metadata characterizing items identified in each ranked search result includes a title of the item and a summary of the item;
        determining a unified ranking for the ranked search results in the received sets of ranked search results based on the determined unified match scores for each search result, wherein the unified ranking maintains a relative ranking of each set of ranked search results as received from the plurality of search resources;
        ordering the search results by the determined unified ranking;
        generating a presentation of the ordered search results, wherein each respective search result included in the presentation comprises the link to the full version of the respective item identified by the respective search result; and
        sending the presentation of the ordered search results over the communications network to the software application executing on the client device.

2. The system of claim 1, wherein the operation further comprises:
    prior to transmitting the search query to at least one of the plurality of search resources, converting the search query into a different format.

3. The system of claim 1, wherein determining the unified ranking further comprises, scoring the search results of each search resource based on rankings provided by the search resource.

4. The system of claim 1, wherein at least one of the items identified in the search results is one of a web site, a news article, or bibliography.

5. The system of claim 1, wherein at least one of the search resources is one of a web-based search engine, a public access library database, a government database, or a corporate database.

6. A computer program product, comprising:
    a computer-readable storage medium having computer-readable program code embodied therewith, the computer-readable program code configured to perform an operation for ranking search results received from a plurality of distinct search resources, the operation comprising:
        receiving a search query over a communications network from a software application executing on a client device;

transmitting the search query to a plurality of search resources via the communications network;

receiving, from each of the plurality of search resources, a set of ranked search results, wherein each search result identifies an item and wherein each search result includes metadata characterizing the item;

determining a unified match score for each search result in the received sets of ranked search results by summing matching scores of each search result ranked below the respective search result in the respective received set of ranked search results, wherein a unified match score of a first ranked search result is determined based on metadata of the first ranked search result and metadata of each second ranked search result having a lower rank than the first ranked search result in the associated set of ranked search results and wherein the metadata characterizing items identified in each ranked search result includes a title of the item and a summary of the item;

determining a unified ranking for the ranked search results in the received sets of ranked search results based on the determined unified match scores for each search result, wherein the unified ranking maintains a relative ranking of each set of ranked search results as received from the plurality of search resources;

ordering the search results by the determined unified ranking;

generating a presentation of the ordered search results, wherein each respective search result included in the presentation comprises a link to a full version of the respective item identified by the respective search result; and sending the presentation of the ordered search results over the communications network to the software application executing on the client device.

7. The computer program product of claim 6, wherein the operation further comprises:

prior to transmitting the search query to at least one of the plurality of search resources, converting the search query into a different format.

8. The computer program product of claim 6, wherein determining the unified ranking further comprises, scoring the search results of each search resource based on rankings provided by the search resource.

9. The computer program product of claim 6, wherein at least one of the search resources is one of a web-based search engine, a public access library database, a government database, or a corporate database.

* * * * *